US008533134B1

(12) United States Patent  (10) Patent No.: US 8,533,134 B1
Zhao et al.  (45) Date of Patent: Sep. 10, 2013

(54) GRAPH-BASED FUSION FOR VIDEO CLASSIFICATION

(75) Inventors: Ming Zhao, San Jose, CA (US); Zheshen Wang, Mountain View, CA (US); Yang Song, San Jose, CA (US)

(73) Assignee: Google Inc., Mountain View, CA (US)

( * ) Notice: Subject to any disclaimer, the term of this patent is extended or adjusted under 35 U.S.C. 154(b) by 188 days.

(21) Appl. No.: 12/938,309

(22) Filed: Nov. 2, 2010

Related U.S. Application Data

(60) Provisional application No. 61/262,125, filed on Nov. 17, 2009.

(51) Int. Cl.
*G06F 15/18* (2006.01)

(52) U.S. Cl.
USPC ............................................................. 706/12

(58) Field of Classification Search
None
See application file for complete search history.

(56) References Cited

U.S. PATENT DOCUMENTS

| | | | |
|---|---|---|---|
| 6,853,982 B2 * | 2/2005 | Smith et al. ................. | 705/26.7 |
| 7,039,856 B2 * | 5/2006 | Peairs et al. ................. | 715/200 |
| 7,107,520 B2 | 9/2006 | Gargi | |
| 7,203,669 B2 | 4/2007 | Lienhart et al. | |
| 8,090,621 B1 * | 1/2012 | Chakrabarti et al. ........ | 705/26.1 |
| 2002/0059221 A1 | 5/2002 | Whitehead et al. | |
| 2006/0031217 A1 * | 2/2006 | Smith et al. ........................ | 707/5 |
| 2007/0255755 A1 | 11/2007 | Zhang et al. | |
| 2008/0228749 A1 * | 9/2008 | Brown ............................... | 707/5 |
| 2009/0281970 A1 * | 11/2009 | Mika et al. ...................... | 706/12 |
| 2009/0292685 A1 | 11/2009 | Liu et al. | |
| 2009/0327336 A1 | 12/2009 | King et al. | |
| 2010/0125539 A1 * | 5/2010 | Aucouturier et al. ........... | 706/12 |

OTHER PUBLICATIONS

Siersdorfer et al, Automatic Video Tagging using Content Redundancy, Jul. 2009.*
Chang et al, Combining text and audio-visual features in video indexing, 2005.*
Toderici et al, Finding Meaning on YouTube: Tag Recommendation and Category Discovery, 2010.*
Cao, L., et al., "Annotating Photo Collections by Label Propagation According to Multiple Similarity Cues," Proceeding of the 16th ACM international conference on Multimedia, 2008, 9 pages.
Carvalho, R., "Metadata goes where Metadata is: contextual networks in the photographic domain," ESWC 2008 Ph. D. Symposium, 2008, 5 pages.
Chang, S., et al., "Recent Advances and Challenges of Semantic Image/Video," IEEE International Conference on Acoustics, Speech and Signal Processing, 2007, 4 pages.
Rodriguez, M., et al., "Automatic Metadata Generation Using Associative Networks," ACM Transactions on Information Systems, Feb. 2009, pp. 7:1-7:20, vol. 27, No. 2, Article 7.
Agarwal, N., et al., "Blocking Objectionable Web Content by Leveraging Multiple Information Sources," SIGKDD Explor. Newsl., 2006, vol. 8, No. 1, pp. 17-26.

(Continued)

*Primary Examiner* — Jeffrey A Gaffin
*Assistant Examiner* — Mikayla Chubb
(74) *Attorney, Agent, or Firm* — Fenwick & West LLP

(57) ABSTRACT

A classifier training system trains unified classifiers for categorizing videos representing different categories of a category graph. The unified classifiers unify the outputs of a number of separate initial classifiers trained from disparate subsets of a training set of media items. The training process takes into account the relationships that exist between the various categories of the category graph by relating scores associated with related categories, thus enhancing the accuracy of the unified classifiers.

20 Claims, 4 Drawing Sheets

(56) References Cited

OTHER PUBLICATIONS

Ayad, H.G., et al., Cumulative Voting Consensus Method for Partitions with Variable No. of Clusters, IEEE Transactions on Pattern Analysis and Machine Intelligence, Jan. 2008, vol. 30, No. 1, pp. 160-173.

Ayad, H.G., et al., "On Voting-Based Consensus of Cluster Ensembles," Pattern Recognition, May 2010, vol. 43, No. 5, pp. 1943-1953.

Baluja, S., et al., "Video Suggestion and Discovery for YouTube: Taking Random Walks Through the View Graph," Proceedings of the International World Wide Web Conference, 2008, 10 pages.

Barnard, K., et al., "Matching Words and Pictures," Journal of Machine Learning Research, 2003, vol. 3, pp. 1107-1135.

Belkin, M., et al., "Manifold Regularization: A Geometric Framework for Learning from Labeled and Unlabeled Examples," Journal of Machine Learning Research, 2006, vol. 7, pp. 2399-2434.

Blei, D., et al., "Modeling Annotated Data," Proc. ACM SIGIR, 2003, pp. 127-134.

Blum, A., et al., "Combining Labeled and Unlabeled Data with Co-Training," COLT: Proceedings of the Workshop on Computational Learning Theory, Morgan Kaufmann Publishers, 1998.

Boureau, Y.L., et al., "Learning Mid-Level Features for Recognition," Conference on Computer Vision and Pattern Recognition, 2010, pp. 2559-2566.

Brubaker, S. C., et al., "On the Design of Cascades of Boosted Ensembles for Face Detection," International Journal of Computer Vision (IJCV), May 2008, vol. 77, No. 1-3, pp. 65-86.

Brubaker, S. C., et al., "Towards Optimal Training of Cascaded Detectors," Computer Vision—ECCV, Lecture Notes in Computer Science, 2006, vol. 3951/2006, pp. 325-337.

Brubaker, S. C., et al., "Towards the Optimal Training of Cascades of Boosted Ensembles," Toward Category-Level Object Recognition (CLOR), Lecture Notes in Computer Science, 2006, vol. 4170/2006, pp. 301-320.

Cao, X., et al., "Video Shot Motion Characterization Based on Hierarchical Overlapped Growing Neural Gas Networks," Multimedia Systems, Springer-Verlag 2003, School of Electrical and Electronic Engineering, Nanyang Technological University, Nanyang Avenue, Singapore, 639798, pp. 1-8.

Chang, C.-C., et al., "Liblinear: A Library for Large Linear Classification," 2010, [online] [Retrieved on Jan. 17, 2011], Software available at <http://www.csie.ntu.edu.tw/~cjlin/liblinear/>.

Chang, E., et al., "A Unified Learning Paradigm for Large-Scale Personalized Information Management," Proceedings of the Emerging Information Technology Conference, 2005.

Chou, Y.Y., et al., "A Hierarchical Multiple Classifier Learning Algorithm," Proceedings of the 15th International Conference on Pattern Recognition—ICPR 2000, vol. II, pp. 152-155.

Christoudias, C. M., et al., Co-Training with Noisy Perceptual Observations, CVPR, 2009, pp. 1-10.

Cilibrasi, R. L., et al., "A Fast Quartet Tree Heuristic for Hierarchical Clustering," Pattern Recognition, Mar. 2011, vol. 44, No. 3, pp. 662-677.

Concepción Morales, E.R., et al., "Building and Assessing a Constrained Clustering Hierarchical Algorithm," Proceedings of the 13th Iberoamerican Congress on Pattern Recognition, CIARP 2008, Sep. 9-12, 2008, pp. 211-218.

Cordella, L. P., et al., "Combining Single Class Features for Improving Performance of a Two Stage Classifier," Proceedings of the 2010 International Conference on Pattern Recognition, Aug. 23-26, 2010, pp. 4352-4355.

Cour, T., et al., "Learning from Ambiguously Labeled Images," Technical Report, U. Penn., 2009, pp. 1-8.

Day, M., et al., "Constructing Efficient Cascade Classifiers for Object Detection," Proceedings of 2010 IEEE 17th International Conference on Image Processing, Hong Kong, Sep. 26-29, 2010, pp. 3781-3784.

Dekel, O., et al., "Large Margin Hierarchical Classification," ICML, 2004, 8 pages.

Deng, J., et al., "ImageNet: A Large-Scale Hierarchical Image Database," *CVPR09*, 2009, 8 pages.

Duan, L., et al., "Domain Transfer SVM for Video Concept Detection," Proceedings of IEEE Conference on Computer Vision and Pattern Recognition (CVPR), 2009, pp. 1375-1381.

Duchenne, O., et al., "Automatic Annotation of Human Actions in Video," ICCV, 2009, 8 pages.

Dundar, M. M., et al., "Joint Optimization of Cascaded Classifiers for Computer Aided Detection," CVPR07, pp. 1-8.

Duygulu, P., et al., "Object Recognition as Machine Translation: Learning a Lexicon for a XED Image Vocabulary," Computer Vision—ECCV 2002, Proceedings of the 7th European Conference on Computer Vision, Copenhagen, Denmark, May 28-31, 2002, Part IV, pp. 97-112.

El-Sherif, E., et al., "Automatic Generation of Optimum Classification Cascades," International Conference on Pattern Recognition (ICPR), 2008, pp. 1-4.

El-Shishini, H., et al., "A Multistage Algorithm for Fast Classification of Patterns," Pattern Recognition Letters, Oct. 1989, vol. 10, No. 4, pp. 211-215.

Everingham, M., et al., "Hello! My Name is . . . Buffy—Automatic Naming of Characters in TV Video," BMVC, 2006, 10 pages.

Ewerth, R., et al., "Semi-Supervised Learning for Semantic Video Retrieval," Proceedings of the Conference on Image and Video Retrieval (CIVR), Amsterdam, The Netherlands, Jul. 9-11, 2007, pp. 154-161.

Fan, J., et al., "Incorporating Concept Ontology for Hierarchical Video Classification, Annotation, and Visualization," IEEE Transactions on Multimedia, Aug. 2007, vol. 9, No. 5, pp. 939-957.

Fan, R.-E., et al., "Liblinear: a library for large linear classification," Journal of Machine Learning Research, 2008, vol. 9, pp. 1871-1874.

Feng, H., et al., "A Bootstrapping Framework for Annotating and Retrieving WWW Images," Proc. ACM MM, 2004, 8 pages.

Feng, S. L., et al., "Multiple Bernoulli Relevance Models for Image and Video Annotation," Proc. CVPR, 2004, pp. 1-8.

Fergus, R., et al., "A Visual Category Filter for Google Images," ECCV, 2004.

Fergus, R., et al., "Learning Object Categories from Google's Image Search," Proceedings of the 10th IEEE International Conference on Computer Vision (ICCV), 2005, vol. 2, pp. 1816-1823.

Foo, B., et al., "A Distributed Approach for Optimizing Cascaded Classifier Topologies in Real-Time Stream Mining Systems," IEEE Transactions on Image Processing, Nov. 2010, vol. 19, No. 11, pp. 3035-3048.

Freund, Y., et al., "A Decision-Theoretic Generalization of On-Line Learning and an Application to Boosting," Journal of Computer and System Sciences, Aug. 1997, vol. 55, No. 1, pp. 119-139.

Freund, Y., et al., "A Decision-Theoretic Generalization of On-Line Learning and an Application to Boosting," Proceedings of European Conference on Computational Learning Theory (ECCV), Barcelona, Spain, Mar. 13-15, 1995, pp. 23-37.

Giusti, N., et al., "Theoretical and Experimental Analysis of a Two-Stage System for Classification," IEEE Transactions on Pattern Analysis and Machine Intelligence (PAMI), Jul. 2002, vol. 24, No. 7, pp. 893-904.

Gupta, S., et al., "Watch, Listen & Learn: Co-Training on Captioned Images and Videos," Proceedings of the European Conference on Machine Learning and Principles and Practice of Knowledge Discovery in Databases (ECML), 2008, 16 pages.

Hays, J., et al., "IM2GPS: Estimating Geographic Information from a Single Image," Proceedings of the IEEE Conference on Computer Vision and Pattern Recognition (CVPR), 2008.

Heiseleyz, B., et al., "Feature Reduction and Hierarchy of Classifiers for Fast Object Detection in Video Images," Proceedings of the 2001 IEEE Computer Society Conference on Computer Vision and Pattern Recognition (CVPR01), Kauai, Hawaii, Dec. 8-14, 2001, vol. II, pp. 18-24.

Hore, P., et al., "A Scalable Framework for Cluster Ensembles," Pattern Recognition, May 2009, vol. 42, No. 5, pp. 676-688.

Ikizler-Cinbis, N., et al., "Learning Actions from the Web," Proceedings of 12th International Conference on Computer Vision (ICCV), 2009, 8 pages.

Jones, M. J., et al., "Statistical Color Models with Application to Skin Detection," International Journal of Computer Vision (IJCV), Jan. 2002, vol. 46, No. 1, pp. 81-96.

Jordan, M.I., et al., "Hierarchical Mixture of Experts and the EM Algorithm," Neural Computation, 1994, vol. 6, pp. 181-214.

Kalogerakis, E., et al., "Image Sequence Geolocation with Human Travel Priors," Proceedings of the IEEE International Conference on Computer Vision (ICCV'09), 2009, 8 pages.

Kavukcuoglu, K., et al., "Learning Invariant Features Through Topographic Filter Maps," CVPR09, pp. 1605-1612.

Kukenys, I., et al., "Classifier Cascades for Support Vector Machines," 2008 $23^{RD}$ International Conference Image and Vision Computing New Zealand (IVCNZ08), Nov. 26-28, 2008, pp. 1-6.

Kumar, S., et al., "Discriminative Fields for Modeling Spatial Dependencies in Natural Images," Advances in Neural Information Processing Systems (NIPS), 2004, 8 pages.

Lafferty, J., et al., "Conditional Random Fields: Probabilistic Models for Segmenting and Labeling Sequence Data," Proceedings of International Conference on Machine Learning (ICML), 2001, 8 pages.

Laptev, I., et al., "Learning Realistic Human Actions from Movies," Proceedings of the IEEE Conference on Computer Vision and Pattern Recognition (CVPR), 2008, 8 pages.

Leung, T., et al., "Representing and Recognizing the Visual Appearance of Materials Using Three-Dimensional Textons," International Journal of Computer Vision (IJCV), 2001, vol. 43, No. 1, pp. 29-44.

Li, L., et al., "Optimol: Automatic Online Picture Collection Via Incremental Model Learning," Proc. Computer Vision and Pattern Recognition (CVPR), 2007.

Li, Y., et al., "Bagging Based Efficient Kernel Fisher Discriminant Analysis for Face Recognition," the $18^{th}$ International Conference on Pattern Recognition (ICPR06), vol. 3, pp. 523-526.

Liu, J., "Recognizing Realistic Actions from Videos "in the Wild"," Computer Vision and Pattern Recognition (CVPR), 2009, 1996-2003.

Liu, T.-Y., et al., "Support Vector Machines Classification with a Very Large-Scale Taxonomy," SIGKDD Explorations, 2005, vol. 1, pp. 36-43.

Lopez-Maury, L., "A Two-Component Signal Transduction System Involved in Nickel Sensing in the *Cyanobacterium synechocystis* sp. PCC 6803," Molecular Microbiology, 2002, vol. 43, No. 1, pp. 247-256.

Lowe, D. G., "Distinctive Image Features from Scale-Invariant Keypoints," International Journal of Computer Vision (IJCV), 2004, vol. 60, No. 2, pp. 91-110.

Luo, H., "Optimization Design of Cascaded Classifiers," CVPR05, vol. 1, pp. 480-485.

Ma, B. P., et al., "Discriminant Analysis for Perceptionally Comparable Classes," FG08, pp. 1-6.

Mangai, U. G., et al., "A Hierarchical Multi-Classifier Framework for Landform Segmentation Using Multi-Spectral Satellite Images—A Case Study Over the Indian Subcontinent," 2010 Fourth Pacific-Rim Symposium on Image and Video Technology, (PSIVT10), Nov. 14-17, 2010, Singapore, pp. 306-313.

Mirzaei, A., et al., "Combining Hierarchical Clusterings Using Min-Transitive Closure," ICPR08, pp. 1-4.

Montagnuuolo, M., et al., "Parallel Neural Networks for Multimodal Video Genre Classification," Multimedia Tools and Applications, Jan. 2009, vol. 41, pp. 125-159.

Nam, M. Y., et al., "Cascade of Fusion for Adaptive Classifier Combination Using Context-Awareness," AMD006, pp. 252-261.

Neapolitan, R. E., "Learning Bayesian Networks," Prentice Hall, Upper Saddle River, NJ, USA, 2003.

Neven, H., et al., "Image Recognition with an Adiabatic Quantum Computer I. Mapping to Quadratic Unconstrained Binary Optimization," 2008, pp. 107.

Nister, D., et al., "Scalable Recognition with a Vocabulary Tree," CVPR '06: Proceedings of the 2006 IEEE Computer Society Conference on Computer Vision and Pattern Recognition, IEEE Computer Society, Washington, DC, USA, Jun. 2006, vol. 2, pp. 2161-2168.

"OpenDirectoryProject," 1998-2010, [online] [Retrieved on Jan. 16, 2011] Retrieved from the internet <URL:http://www.dmoz.org/>.

Patterson, R. D., et al., "Complex Sounds and Auditory Images," Proc. Auditory Physiology and Perception, 1992, pp. 429-446.

Qi, G.-J., et al., "Correlative Multilabel Video Annotation with Temporal Kernels," ACM Transactions on Multimedia Computing, Communications, and Applications, 2008, vol. 5, No. 1, Article 3, pp. 1-27.

Quost, B., et al., "Pairwise Classifier Combination Using Belief Functions," Pattern Recognition Letters (PRL), Apr. 1, 2007, vol. 28, No. 5, pp. 644-653.

Raina, R., et al., "Self-Taught Learning: Transfer Learning from Unlabeled Data," Proceeding of International Conference on Machine Learning (ICML), Corvallis, OR, 2007, pp. 759-166.

Ramachandran, C., et al., "VideoMule: A Consensus Learning Approach to Multi-Label Classification from Noisy User-Generated Videos," ACM Multimedia, 2009, 4 pages.

Ranzato, M., et al., "Modeling Pixel Means and Covariances using Factorized Third-Order Boltzmann Machines," Proceedings of the IEEE Conference on Computer Vision and Pattern Recognition (CVPR10), 2010, pp. 2551-2558.

Ranzato, M., et al., "Unsupervised Learning of Invariant Feature Hierarchies with Applications to Object Recognition," CVPR07, pp. 1-8.

Rehn, M., et al., "Sound Ranking Using Auditory Sparse-Code Representations," Proc. ICML: Workshop on Sparse Methods for Music Audio, 2009, 3 pages.

Rodriguez, J. J., "Forests of Nested Dichotomies," Pattern Recognition Letters (PRL), Jan. 15, 2010, vol. 31, No. 2, pp. 125-132.

Sargin, E. M., et al., "Audiovisual Celebrity Recognition in Unconstrained Web Videos," Proc. ICASSP, 2009, 4 pages.

Schapire, R. E., "The Boosting Approach to Machine Learning: An Overview," MSRI Workshop on Nonlinear Estimation and Classification, 2002, pp. 1-23.

Schapire, R. E., et al., "Boosting the Margin: A New Explanation for the Effectiveness of Voting Methods," The Annals of Statistics, 1998, vol. 26, No. 5, pp. 1651-1686.

Schindler, G., et al., "Internet Video Category Recognition," First IEEE Workshop on Internet Vision, CVPR, 2008, 7 pages.

Serdyukov, P., et al., "Placing Flickr Photos on a Map," SIGIR'09: Proceedings of the $32^{nd}$ International ACM SIGIR Conference on Research and Development in Information Retrieval, 2009, New York, NY, USA, pp. 484-491.

Singh, R., et al., "Reduced-Complexity Delayed-Decision Algorithm for Context-Based Image Processing Systems," IEEE Transaction on Image Processing, Aug. 2007, vol. 16, No. 8, pp. 1937-1945.

Slonim, N., et al., "Discriminative Feature Selection via Multiclass Variable Memory Markov Model," Proceedings of the Nineteenth International Conference on Machine Learning, 2002, 8 pages.

Smeaton, A. F., et al., "Evaluation Campaigns and TRECVid," Proceedings of the $8^{th}$ ACM International Workshop on Multimedia Information Retrieval, ACM Press, Oct. 26-27, 2006, pp. 321-330.

Snoek, C., et al., "The MediaMill TRECVID 2008 Semantic Video Search Engine," 2009, 14 pages.

Snoek, C. G.M., et al., "Early Versus Late Fusion in Semantic Video Analysis," ACM Multimedia 2005, Nov. 6-11, 2005, Singapore, 4 pages.

Song, Y., et al., "Taxonomic Classification for Web-Based Videos," Conference on Computer Vision and Pattern Recognition (CVPR), 2010.

Su, Y., et al., "Hierarchical Ensemble of Global and Local Classifiers for Face Recognition," IP, Aug. 2009, vol. 18, No. 8, pp. 1885-1896.

Sun, A., et al., Hierarchical Text Classification and Evaluation, Proceedings of the 2001 IEEE International Conference on Data Mining (ICDM), Nov. 2001, pp. 521-528.

Sun F., et al., "Two-Stage Computational Cost Reduction Algorithm Based on Mahalanobis Distance Approximations," ICPR00, vol. II, pp. 696-699.

Szczot, M., et al., "Package Boosting for Readaption of Cascaded Classifiers," 2010 International Conference on Pattern Recognition (ICPR10), pp. 552-555.

Tola, E., et al., "A Fast Local Descriptor for Dense Matching," Proceedings of IEEE Conference on Computer Vision and Pattern Recognition (CVPR), 2008, Alaska, USA, pp. 1-15.

Van Laere, O., et al., "Towards Automated Georeferencing of Flickr Photos," GIR'10: Proceedings of the 6th Workshop on Geographic Information Retrieval, Feb. 18-19, 2010, pp. 1-7.
Viola, P., et al., "Rapid Object Detection Using a Boosted Cascade of Simple Features," Proceedings of IEEE Computer Society Conference on Computer Vision and Pattern Recognition (CVPR), 2001, vol. 1, pp. 511-518.
Visentini, I., et al., "Cascaded Online Boosting," Journal of Real-Time Image Processing, Dec. 2010, vol. 5, No. 4, pp. 245-257.
Visentini, I, et al., "On-Line Boosted Cascade for Object Detection," ICPR08, pp. 1-4.
Vuurpijl, L., et al., "An Overview and Comparison of Voting Methods for Pattern Recognition," Proceedings of the Eighth International Workshop on Frontiers in Handwriting Recognition (IWFHR02), 2002, pp. 195-200.
Vuurpijl, L., et al., "Architectures for Detecting and Solving Conflicts: Two-Stage Classification and Support Vector Classifiers," International Journal on Document Analysis and Recognition (IJDAR), Jul. 2003, vol. 5, No. 4, pp. 213-223.
Wang, P., et al., "Training a Multi-Exit Cascade with Linear Asymmetric Classification for Efficient Object Detection," Proceedings of 2010 IEEE $17^{th}$ International Conference on Image Processing (ICIP10), Hong Kong, Sep. 26-29, 2010, pp. 61-64.
Wu, D., et al., "A Min-Max Framework of Cascaded Classifier with Multiple Instance Learning for Computer Aided Diagnosis," Proceedings of IEEE Computer Society Conference on Computer Vision and Pattern Recognition (CVPR09), 2009, pp. 1359-1366.
Wu D., et al., "Resilient Subclass Discriminant Analysis," ICCV09, pp. 389-396.
Wu, J. X., et al., "Fast Asymmetric Learning for Cascade Face Detection," IEEE Transactions on Pattern Analysis and Machine Intelligence (PAMI), Mar. 2008, vol. 30, No. 3, pp. 369-382.
Wu, X., et al., "Incorporating Prior Knowledge with Weighted Margin Support Vector Machines," Proceedings of the International Conference on Knowledge Discovery and Data Mining (SIGKDD), 2004, pp. 326-333.
Yagnik, J., et al., "Learning People Annotation from the Web Via Consistency Learning," Proc. Workshop on MIR, Augsburg, Bavaria, Germany, Sep. 28-29, 2007, pp. 285-290.
Yan, S.Y., et al., "Matrix-Structural Learning (MSL) of Cascaded Classifier from Enormous Training Set," Computer Vision and Pattern Recognition (CVPR07), 2007, pp. 1-7.
Yanai, K., et al., "Probabilistic Web Image Gathering," Proc. ACM SIGMM Workshop on MIR, 2005, pp. 57-64.
Yang, J., et al., "Cross-Domain Video Concept Detection Using Adaptive SVMS," Proceedings of the $15^{th}$ International Conference on Multimedia, Sep. 2007, Augsburg, Bavaria, Germany, 10 pages.
Yang, L., et al., "Multi-Modality Web Video Categorization," Proc. MIR, 2007, ACM Press, pp. 265-274.
"YouTube—Broadcast Yourself," 2011, [online] [Retrieved on Jan. 16, 2011] Retrieved from the internet <URL:http://www.youtube.com>.
Zanetti, S., et al., "A Walk Through the Web's Video Clips," First IEEE Workshop on Internet Vision, Computer Vision and Pattern Recognition (CVPRO8), 2008, 8 pages.
Zhang, B.C., et al., "Discriminant Analysis Based on Kernelized Decision Boundary for Face Recognition," AVBPA05, LNCS 3546, 2005, pp. 966.
Zhang, H., et al., "Automatic Partitioning of Full-Motion Video," Multimedia Systems, 1993, vol. 1, No. 1, pp. 10-28.
Zhang, X.Q., "Clustering by Evidence Accumulation on Affinity Propagation," ICPR08, 2008, pp. 1-4.
Zhao, M., et al., "Large Scale Learning and Recognition of Faces in Web Videos," Proceedings of the $8^{th}$ IEEE International Conference on Automatic Face and Gesture Recognition, 2008, 7 pages.
Zhao, R., et al., "Narrowing the Semantic Gap—Improved Text-Based Web Document Retrieval Using Visual Features," IEEE Transactions on Multimedia, Jun. 2002, vol. 4, No. 2, pp. 189-200.
Zheng, Y.-T., et. al, "Tour the World: Building a Web-Scale Landmark Recognition Engine", Proceedings of the International Conference on Computer Vision and Pattern Recognition, Jun. 2009, Miami, Florida, U.S.A., pp. 1-8.
Zhu, X., et al., "Learning from Labeled and Unlabeled Data with Label Propagation," CMU CALD Tech Report CMU-CALD-02-107, 19 pages.
Zhu, X., "Semi-Supervised Learning Literature Survey," Computer Sciences Technical Report 1530, University of Wisconsin-Madison, 2005, pp. 1-38.
Aradhye, H., et al., "Video2Text: Learning to annotate video content," IEEE International Conference on Data Mining Workshops, Dec. 6, 2009, pp. 144-151.
Blum, A., et al., "Combining Labeled and Unlabeled Data with Co-Training," COLT: Proceedings of the Workshop on Computational Learning Theory, Morgan Kaufmann Publishers, 1998, pp. 92-100.
Cai, C., et al., "Hierarchical clustering of WWW image search results using visual, textual and link information," in Proc. of ACM MM'04, Oct. 10-16, 2004, pp. 952-959.
Cui, F., et al., "Content-enriched classifier for web video classification," In Proc. of SIGIR'10, Jul. 19-23, 2010, pp. 619-626.
Feng, H., et al., A boot-strapping framework for annotating and retrieving WWW images. In Proc. of ACM MM'04, Oct. 10-16, 2004, pp. 55-62.
Fischer, S., et al., Automatic recognition of film genres, in Proc. of ACM Multimedia'95, Nov. 5-9, 1995, pp. 295-304.
Hall, K., et al., "MapReduce/Bigtable for distributed optimization," In NIPS 2010 Workshop on Learning on Cores, Clusters and Clouds, 2010, pp. 1-7.
Huang, G., et al., Text-based video content classification for online video- sharing sites. Journal of the American Society for Information Science and Technology, 2010, vol. 61, No. 5, pp. 891-906.
Lin, A., et al., "News video classification using SVM-based multimodal classifiers and combination strategies," in Proc. of ACM Multimedia'02, Dec. 1-6, 2002, pp. 323-326.
Toderici, H., et al., "Finding meaning on YouTube: Tag recommendation and category discovery," In Proc. of IEEE CVPR-10, 2010, 8 Pages.
Yang, E., et al., "Multi-modality web image categorization," in Proc. of ACM MIR-07, Sep. 28-29, 2007, pp. 265-274.
Zhang, D., et al., ""Joint categorization of queries and clips for web-based video search, in Proc. of MIR'06, Oct. 26-27, 2006, pp. 193-202.
Anderson, R., A local algorithm for finding dense subgraphs, In Proc. 19th Annual ACM-SIAM Symposium on Discrete Algorithms, 2008, pp. 1003-1009.
Davison, B. D., "Topical locality in the web," In Proc. 23rd Annual International ACM SIGIR Conference on Research and Development in Information Retrieval, 2004, pp. 272-279.
Dumais, S., et al., "Hierarchical classification of web content," In SIGIR '00: Proceedings of the $23^{rd}$ annual international ACM SIGIR conference on Research and development in information retrieval, pp. 256-263, New York, NY, USA, 2000. ACM.
Goldman, S., et al., "Enhancing supervised learning with unlabeled data," In Proc. $17^{th}$ International Conference on Machine Learning, 2000, pp. 327-334.
Guillaumin, M., et al., "Multimodal semi-supervised learning for image classification," In Proc. IEEE Conf. Computer Vision and Pattern Recognition, Jun. 2010, pp. 902-909.
Halevy, A., et al., "The unreasonable effectiveness of data," Intelligent Systems, IEEE, Mar. 2009, pp. 8-12, vol. 24, No. 2.
Huang, J., et al., "Exploring web scale language models for search query processing," In Proc. 19th international conference on World wide web, Apr. 26-30, 2010, pp. 451-460.
Koller, D., et al., "Hierarchically classifying documents using very few words," In the Proceedings of the Fourteenth International Conference on Machine Learning, ICML, Jul. 8-12, 1997, pp. 170-178.
Li, L.-J., et al., "Towards total scene understanding: Classification, annotation and segmentation in an automatic framework," In Proc. IEEE Conf. Computer Vision and Pattern Recognition, 2009, pp. 2036-2043.

Mahajan, D., et al., "Image classification using the web graph," In Proc. Multimedia, Oct. 25-29, 2010, pp. 991-994.

Niebles, J. C., et al., "Extracting moving people from internet videos," In ECCV '08: Proceedings of the 10th European Conference on Computer Vision, 2008, pp. 527-540, Part IV, LNCS 5305.

Tang, L., et al., "Large scale multi-label classification via metalabeler," In Proc. 18$^{th}$ International Conference on World Wide Web, Apr. 20-24, 2009, pp. 211-220.

Wang, Z., et al., "Youtubecat: Learning to categorize wild web videos," In Proc. IEEE Conf. Computer Vision and Pattern Recognition, Jun. 2010, pp. 879-886.

Zhu, X., Semi-supervised learning literature survey. In Tech Report. University of Wisconsin—Madison, Jul. 2008, pp. 1-60.

* cited by examiner

GRAPH-BASED FUSION FOR VIDEO CLASSIFICATION

CROSS REFERENCE TO RELATED APPLICATIONS

The application claims the benefit of Provisional Application No. 61/262,125, filed on Nov. 17, 2009, which is incorporated herein by reference.

BACKGROUND

1. Field of Art

The present invention generally relates to the field of digital video, and more specifically, to methods of generating accurate classifiers for identifying categories of a video.

2. Background of the Invention

Video hosting services, such as YOUTUBE™, have become an increasingly popular way of sharing and viewing digital videos, with users contributing tens of millions of videos each year. Accurate categorization of a video is of great value in such systems, permitting users to search for videos corresponding to given categories, and the video hosting service to more accurately match videos with relevant advertising, and the like.

However, the descriptive metadata information provided by the user who contributes a video often does not result in the correct categorization of the video. For example, for a set of predetermined categories including categories such as "Sports," "Basketball," "Tennis," and the like, a video entitled with the name of a tennis player featured in the video would not in itself directly permit the video to be properly categorized as "Tennis" or "Sports."

Machine learning algorithms can be employed to train a classifier function for a given category (e.g., "Tennis") that, when applied to features of a video (such as metadata of the video), outputs a measure of the relevance of the video to the category. Then, the trained classifier function for a given category can be applied to a video and the resulting measure of relevance used to determine whether the video is within that category. However, to train a classifier function for a category, most learning algorithms employ supervised learning, which requires as input a training set of videos known a priori to be representative of the category. Further, supervised learning tends to produce more accurate classifier functions when trained on a larger training set, and/or a training set with features that are more useful for categorization purposes. A training set useful for supervised learning can be produced by humans viewing videos and manually categorizing them into different categories, but manual categorization is time-consuming due to the need to watch the entire video, or at least a significant representative portion thereof. Nor can humans efficiently view and label a sufficiently large sample of videos in a video hosting service where tens of thousands of videos are being uploaded every day. Thus, there are typically few pre-categorized videos available for training purposes, and the classifier functions trained using these small training sets are therefore not as effective as could be desired in categorizing the large number of videos that have not already been manually categorized.

Additionally, some conventional algorithms that train classifier functions for various categories assume that the categories are independent of each other. When the categories do in fact have some relationship, such as being "parent" or "child" categories to each other, this assumption of category independence fails to capture relationship information that could provide additional accuracy to the trained classifier functions.

SUMMARY

A classifier training system trains a classifier functions (hereinafter simply "classifiers") for categorizing videos representing different categories of a category graph. The classifiers are referred to as unified classifiers in that they unify the outputs of a number of separate initial classifiers trained from multiple disparate subsets of a training set of media items. Each unified classifier thus unites different types of training information within a single classifier. The training of a unified classifier takes into account inter-category relationships, which enhances training accuracy.

More specifically, the classifier training system begins with some set of pre-determined categories arranged in a graph indicating relationships between categories, wherein nodes in the graph represent categories, and edges between nodes represent relationships between categories. For example, the category graph could include a node for the category "Tennis" with an edge to a node for the parent category "Sports." The classifier training system further begins with a training set of media items from which the unified classifier is trained. The media items can include—in addition to videos—other types of content, such as web pages and other textual documents, images, sound files, and the like. The training set comprises a first subset of videos, each of which has been previously authoritatively labeled (e.g., by a human expert) as representing one or more of the categories. The classifier training system also begins with one or more other subsets of media items, each set of which can be of a different content type (e.g., web pages rather than videos) or obtained in a different manner (e.g., videos that are automatically inferred to be in the same categories as one of the videos of the first subset because they were "co-watched" along with the first video).

For each category, there are multiple initial classifiers, each of which outputs a value indicating whether a given media item represents the initial classifier's category. The initial classifiers are trained from combinations of the first subset of videos with the other subsets of media items. For example, for each category there could be (1) an initial classifier trained from the textual features of the videos of the first subset and of videos co-watched with the videos of the first subset, and (2) another initial classifier trained from the audiovisual features of these same two subsets. The training of the initial classifiers may be performed by the classifier training system itself, or it may be performed by another system, with the initial classifiers being provided as input to the classifier training system.

The initial classifiers for each category are then applied to each media item in the training set to generate scores representing whether (or how strongly) the media item represents the associated categories. For a given media item, these scores—e.g., Boolean or scalar values—form a feature vector describing characteristics of the media items to which they correspond. For example, a given media item there would have a feature vector of M*K scores, one for each of the K categories and the M initial classifiers per category. Thus, features from subsets of the media items with potentially different characteristics are combined within a single feature vector.

The scores computed from the initial classifiers as applied to the media items of the training set are provided as input for a fusion process that trains the unified classifiers, one per category. The fusion process learns classifier parameters of a probabilistic graph-based algorithm based on the known category labels of the media items of the training set, on the computed scores, and on the relationships between the categories of the category graph. In one embodiment, the fusion process relates the scores associated with neighboring nodes of the category graph as part of its computations, thus taking into account the inter-category relationships.

Once the classifier parameters have been learned as part of the training of the unified classifiers, the unified classifiers can then be applied to an arbitrary video, each unified classifier producing as its output a score for each of the categories that indicates how strongly the video represents that category.

In one embodiment, the classifier training system is not limited to learning unified classifiers for digital videos, specifically, but rather can learn unified classifiers for any media object for which meaningful features can be extracted, including images, presentations, text documents, audio files, and the like.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Architecture

Figure 1:
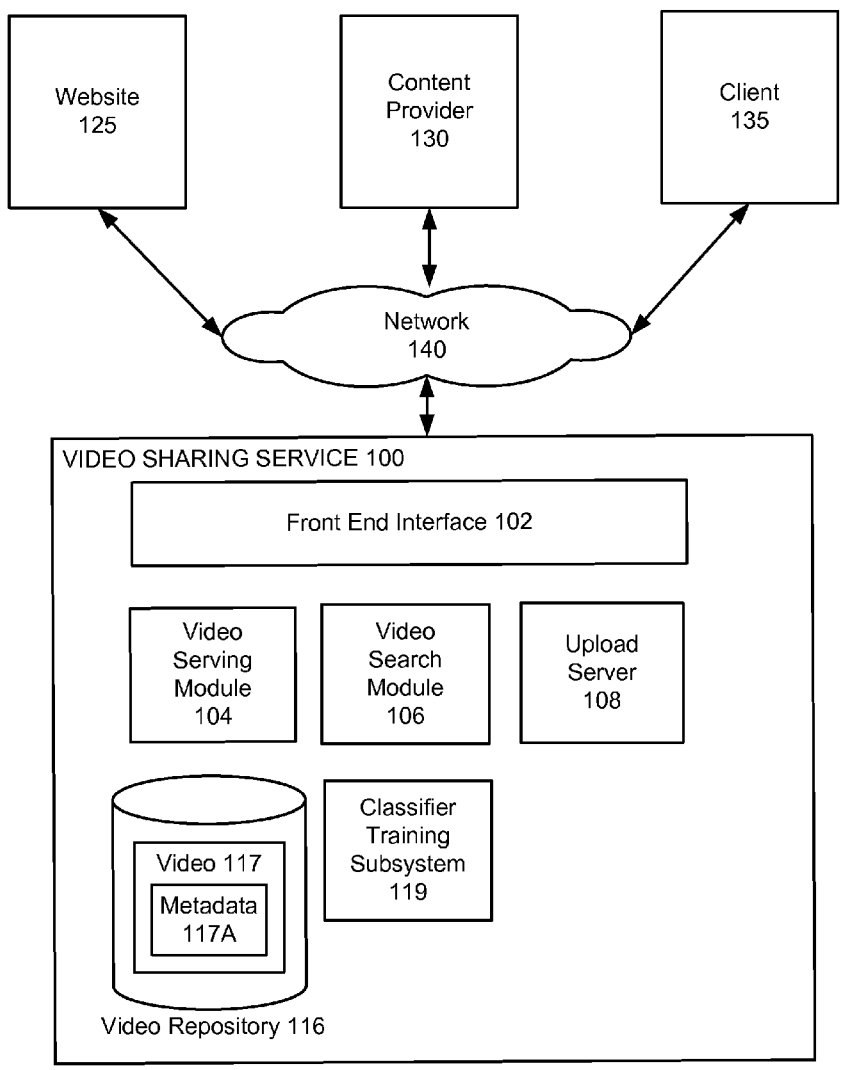
FIG. 1 is a block diagram of a video hosting service in which classifier training can be employed, according to one embodiment.

FIG. 1 is a block diagram of a video hosting service 100 in which classifier training can be employed, according to one embodiment. The video hosting service 100 represents a system such as that of YOUTUBE™ that stores and provides videos to users via client devices 135. The video hosting service 100 communicates with a plurality of content providers 130 and client devices 135 via a network 140 to facilitate sharing of video content between users. The video hosting service 100 can additionally obtain data from various external websites 125. The video data from the content providers 130, and (optionally) the web page or other data from the websites 125, serves as input data for classifier training performed by the video hosting service 100. Note that for the sake of clarity FIG. 1 depicts only one instance of website 125, content provider 130 and client device 135, though there could be any number of each.

Generally, a user of the content provider device 130 provides video content to the video hosting service 100 and a (usually different) user uses a client device 135 (also referred to simply as "client") to view that content. In practice, content provider devices 130 may also be used to view content. Additionally, a particular content provider device 130 may be operated by the same entity that operates the video hosting service 100.

The user of the content provider device 130 performs various content provider functions. Content provider functions may include, for example, uploading a video to the video hosting service 100, editing a video stored by the video hosting service 100, editing metadata information about a video, or editing content provider preferences associated with a video.

A client device 135 is a computing device that executes client software, e.g., a web browser or built-in client application, to connect to the video hosting service 100 via a network 140 and to display videos. The client device 135 might be, for example, a personal computer, a personal digital assistant, a cellular, mobile, or smart phone, a television "set-top box," or a laptop computer. In some embodiments, the client 135 includes an embedded video player such as, for example, the FLASH player from Adobe Systems, Inc. or any other player adapted for the video file formats used in the video hosting service 100.

Note that the terms "client" and "content provider" as used herein may refer to software providing client and content providing functionality, to hardware devices on which the software executes, or to the entities operating the software and/or hardware, as is apparent from the context in which the terms are used.

The website 125 comprises one or more web pages accessible to the video hosting service 100 via the network 140. The web pages comprise, for example, textual content such as HTML. The website may make available additional types of media content, such as general textual documents, presentations, audio files, image files, and the like.

The network 140 is typically the Internet, but may be any network, including but not limited to a LAN, a MAN, a WAN, a mobile wired or wireless network, a private network, or a virtual private network.

The video hosting service 100 operates on the video data from the content providers 130 (and, optionally, from the website 125) when training video classifiers. The video hosting service includes a front end interface 102, a video serving module 104, a video search module 106, an upload server 108, and a video repository 116. Other conventional features, such as firewalls, load balancers, authentication servers, application servers, failover servers, site management tools, and so forth are not shown so as to more clearly illustrate the features of the video hosting service 100. One example of a suitable service 100 is the YOUTUBE™ website, found at www.youtube.com. Other video hosting sites are known, as well, and can be adapted to operate according to the teachings disclosed herein.

In this description, the term "module" refers to computational logic for providing the specified functionality. A module can be implemented in hardware, firmware, and/or software. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the service 100, loaded into memory, and executed by the one or more processors of the service's computers. The foregoing further applies to components described herein as "servers."

The upload server 108 of the video hosting service 100 receives video content from a content provider 130. Received content is stored in the video repository 116. In response to requests from clients 135, a video serving module 104 provides video data from the video repository 116 to the clients. Clients 135 may also search for videos of interest stored in the video repository 116 using a video search module 106, such as by entering textual queries containing keywords of interest. The front end interface 102 provides the interface between client 135 and the various components of the video hosting service 100.

The video repository 116 contains a set of videos 117 submitted by content providers 130. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4, H.264, and the like. In addition to their audiovisual content, the videos 117 further have associated metadata 117A, e.g., textual metadata such as a title, description, and/or tags provided by a content provider 130 who uploaded the video.

The video hosting service 100 further comprises a classifier training subsystem 119 that trains an accurate video classifier for a predetermined set of categories, even in the absence of a large number of labeled videos to use as training examples. The trained classifier can then be applied to a given video to determine which of the categories the video represents. In one embodiment, the classifier training subsystem 119 is part of the video hosting service 100, as depicted in FIG. 1. In another embodiment, the classifier training subsystem 119 is separate from the video hosting service 100, receiving input from it and providing output to it. The classifier training subsystem 119 is described in greater detail in FIG. 2.

The service 100 may be implemented using a single computer, or a network of computers, including cloud-based computer implementations. The computers are preferably server class computers including one or more high-performance CPUs and 1 G or more of main memory, as well as 500 Gb to 2 Tb of computer readable, persistent storage, and running an operating system such as LINUX or variants thereof. The operations of the service 100 as described herein can be controlled through either hardware or through computer programs installed in computer storage and executed by the processors of such servers to perform the functions described herein. The service 100 includes other hardware elements necessary for the operations described here, including network interfaces and protocols, input devices for data entry, and output devices for display, printing, or other presentations of data.

Figure 2:
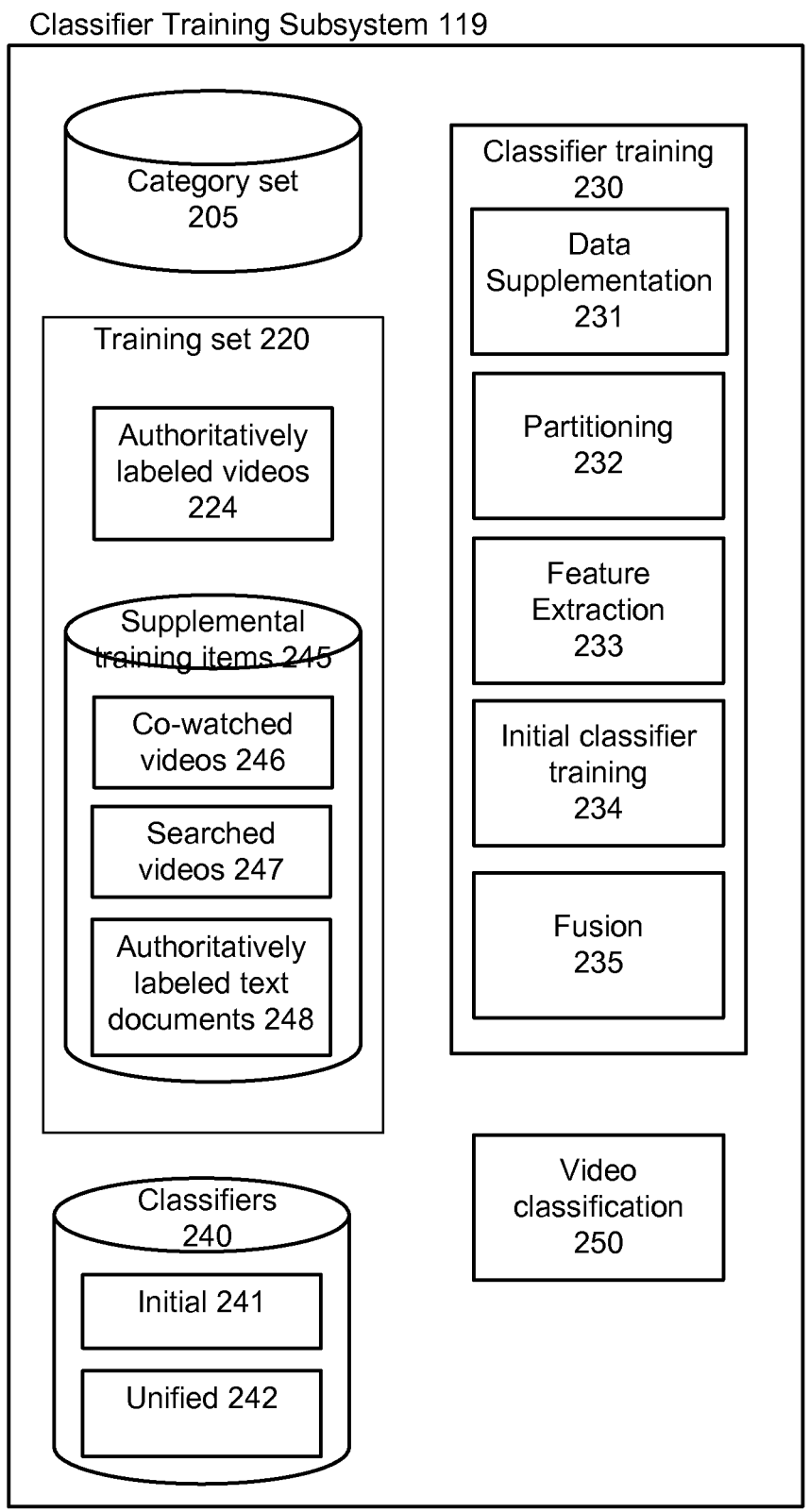
FIG. 2 illustrates the various components of the classifier training subsystem of FIG. 1, according to one embodiment.

FIG. 2 illustrates the various components of the classifier training subsystem 119, according to one embodiment. The classifier training subsystem 119 trains classifiers based in part on a set of categories and on a set of videos that have been previously authoritatively labeled by an authoritative source as representing one or more of the categories. As part of the training process, a module of the classifier training subsystem 119 further identifies additional training sample items, possibly of different media types, for each of the categories in addition to the labeled videos. The different media types for these training items may include—in addition to videos—textual documents such as web pages, audio, and images. Each of the additional samples is identified using one of a set of different techniques, such as identifying co-played videos or identifying web pages authoritatively labeled as representing a particular category. By supplementing the manually labeled videos with these additional training items, possibly including different media types, a training set of significant size can be created even where the manually labeled videos themselves are relatively few in number, thus increasing the accuracy of the trained classifiers. The combination of the labeled videos and the additional training sample items of different media types then serves as a supplemental training set that is provided as input to a classifier training algorithm. The various modules of the classifier training subsystem 119 process the supplemental training set, thereby training initial classifiers that can automatically categorize videos with a certain degree of accuracy. Output of the classifiers is then combined to train unified classifiers with still higher degrees of accuracy. The training of the unified classifiers is done using a graph algorithm that takes into account the structure of the category graph, including the relationships between neighboring categories (e.g., parent or child categories) in the graph.

More specifically, the classifier training subsystem 119 stores a predefined category set 205 representing different possible categories that a video could represent, such as "Sports," "Tennis," "Gymnastics," "Arts & Entertainment," "Movies," "TV & Video," and the like. The various categories of the category set 205 have some relationship with one or more other categories in the set, such that the set can be represented as a category graph, each node of the graph being a category, and edges between the nodes representing some relationship between the categories represented by the nodes connected by the edge. In one embodiment, the category set 205 is more specifically a taxonomy in which the categories of the graph are arranged hierarchically as a tree, with categories being more general parents and/or more specialized children of other categories. For instance, referring to the example categories above, "Sports" could be a top-level parent category with child categories "Tennis" and "Gymnastics," and "Arts & Entertainment" could be another top-level category with child categories "Movies" and "TV & Video." The child categories may in turn have their own child categories. In general, the taxonomy may have any number of levels of depth. In another embodiment, the category set 205 is non-hierarchical, with the nodes of the graph arbitrarily connected.

A category can be represented in various manners as would be appreciated by one of skill in the art, such as a textual label (e.g., the string "Sports") and an associated unique shorthand numerical identifier (e.g., 1). A video can be said to represent a category if the video contains some semantically understandable representation of the category within the video content itself. For example, a video represents a category "Tennis" if (for instance) there are scenes of a tennis match within the visual content of the video. A video can represent many different categories (e.g., both "Sports" and "News"), but users typically are interested in what may be considered the most salient category for the video.

In one embodiment, in order to permit training of classifiers of sufficient accuracy, each of the categories has associated with it some minimum number of training sample items. That is, although there may initially have been some large number of potential categories, the final category set 205 will include only the potential categories that have the minimum number of associated training items.

The classifier training subsystem 119 further comprises a training set 220 containing various content items, such as videos and web pages, that can be associated with various ones of the categories. The content items are labeled—either explicitly or implicitly—with one or more of the categories from the category set 205. The content items, along with their labels, are then used to train classifiers for the various categories with which the content items are associated.

The training set 220 comprises a set of authoritatively labeled videos 224, previously authoritatively labeled as representing one or more categories from the category set 205. In one embodiment, the videos are manually labeled by one or more human experts trained in the meaning and use of the category set 205; this involves the human expert viewing a representative portion of each video and then specifying which categories the video represents based on the portion viewed. In another embodiment, the authoritative labeling is performed by a labeling algorithm that categorizes videos with a high degree of accuracy. In another embodiment, a hybrid approach is used in which videos are initially categorized by a labeling algorithm, with subsequent human review and validation of some (or all) of the labels. In embodiments in which the category set 205 is represented as a taxonomy tree, in which case there will be categories that are leaf nodes of the tree, a video is labeled with the most applicable leaf node category in the taxonomy. For example, a video about tennis is labeled "Tennis," not "Sports"; the fact that the video also more generally represents sports can be inferred from the fact that "Tennis" is a child category of "Sports" in the taxonomy tree. In one embodiment, the videos which are authoritatively labeled represent a subset of the video repository 116 that was determined to be particularly popular, such as the videos most frequently viewed over a particular recent time period. Thus, in order for a category to have a threshold number associated training items in this embodiment, it must first have a sufficient number of popular videos, and then a minimum number of these popular videos must be authoritatively labeled. In other embodiments, the videos need not meet any popularity criterion prior to being labeled.

Authoritatively labeling a video, particularly when done by a human expert who watches a representative portion of the video, is time-consuming, and thus it can be slow and costly to label enough videos 224 for performing adequate classifier training. Thus, the training set 220 also beneficially comprises a set of supplemental training items 245 that can be labeled with less effort, albeit possibly with less certainty. These supplemental training items can then be combined with the authoritatively labeled videos to form a larger training set. The supplemental training set preferably includes both similar media items (e.g., other videos) as well as other types of media items (e.g., web pages, images).

Specifically, in the embodiment depicted in FIG. 2, the supplemental training items repository 245 comprises subsets of videos 246 and 247 automatically labeled based on observed relationships, and a subset of web pages 248 authoritatively labeled in a manner similar to that by which the authoritatively labeled videos 224 were labeled. It is appreciated, however, that these particular sets of items are merely representative of one embodiment, and that the supplemental training items repository 245 need not contain items of those same content types, or items labeled using the same techniques, and many contain different numbers of subsets than the three depicted in FIG. 2.

The co-watched videos 246 of the supplemental training set 245 are automatically labeled based on observed relationships with the authoritatively labeled videos 224 resulting from user actions. That is, for a given one of the authoritatively labeled videos 224, the videos that are played directly before or after it, or within some set time period of it (e.g., 20 minutes), by the same user are considered "co-watched" and are assumed to represent the same category or categories as those of the authoritatively labeled video. Each of the labels of the given authoritatively labeled video are then copied to its co-watched videos 246. In one embodiment, in order to reduce the number of co-watched videos 246 that are not truly representative of the same category, only videos with co-watch counts greater than a threshold (e.g., 100) are added to the co-watched videos 246. The number of non-representative co-watched videos 246 may also be reduced through use of additional techniques, such as computing a degree of similarity between keywords or other metadata of the authoritatively labeled video and the co-watched videos 246 and removing co-watched videos lacking some minimum degree of similarity.

The searched videos 247 of the supplemental training set 245 are automatically labeled based on the results of video search engines, such as those of YOUTUBE™. That is, each category label is provided as input to a video search engine, and a set of videos is identified as a result. (E.g., the category label "Tennis" is entered, and the video search engine provides a set of videos determined to represent tennis.) The category is then applied as a label to each of the videos in the search result set. In one embodiment, a maximum of 5,000 such videos is labeled for each category, including the videos found to be representative of child categories. (E.g., videos for "Tennis" are included among the videos associated with "Sports.") Using the video search engine itself to obtain videos associated with the categories considerably speeds up the creation of a robust training set, and leverages the categorization knowledge that is embedded within the video search engine.

The authoritatively labeled text documents 248 of the supplemental training set 245 contain primarily textual content, and in one embodiment comprise web pages from various web sites. In other embodiments, the text documents 248 additionally and/or alternatively comprise other types of documents with significant textual content, such as word processing files, pure text files, and the like. The text documents 248 may contain non-textual elements, such as backgrounds, images, etc., in addition to their purely textual portions. The text documents 248 are labeled in the same manner as the authoritatively labeled videos 224. That is, a human expert (for example) examines a text document, such as a web page, and labels it with the label of one or more of the categories of the category set 205. However, since a textual document such as a web page can typically be analyzed much more quickly than a video, which must be watched for some not insignificant period of time before it can be classified, the authoritatively labeled web pages 248 can be labeled with far less cost and effort and can thus include a far greater number of items. In one embodiment, the text documents are tentatively labeled by an automated process, such as a computer program that assigns the tentative labels based on metadata keywords, and the human experts review the tentative labels, accepting or rejecting them as appropriate.

Thus, the training set 220 includes content items obtained using different techniques, such as manual labeling, automatic identification of co-watched videos, and execution of queries on a video search engine. Additionally, the content items may be of different content types, such as video and text, which have different content properties—that is, videos have both audiovisual content and also textual content (e.g., associated textual metadata), whereas text documents have only textual content.

The various items of the training set 220 need not be equally distributed amongst the various categories of the category set 205. Rather, different categories may have different numbers of corresponding items. In one embodiment, categories lacking some threshold number of items—e.g., at least 50 authoritatively labeled videos 224—are discarded for purposes of future classifier training. Thus, for example, although the category set 205 might originally have a thousand distinct categories, only a small number of categories (e.g., 30) might have a sufficient number of associated training items 220 to be included in the classifier training.

The labeling of the various training items 220 can be implemented in various manners in different embodiments. For example, each content item can be associated with some representation of the one or more categories that it represents, e.g., via a list of the shorthand numerical identifiers for the various categories. Alternatively, the association could be reversed, with each category being associated with identifiers of the associated content items, such as video identifiers, URLs of web pages or other textual documents, and the like. The associations may be stored in any type of data structure that makes access and analysis of the labels efficient. The labels can be stored with the metadata of each item 220, or in a separate table, array, index, tree, or other structure.

It is appreciated that the content of the training set 220 need not wholly or even partially be physically present within the classifier training subsystem 119 of the video hosting service 100. For example, in one embodiment one or more of the authoritatively labeled videos 224 and the supplemental training items 245 are stored on computing systems remote from the video hosting service 100, and the classifier training subsystem 119 accesses them from their remote locations. For example, the authoritatively labeled text documents 248 may be stored remotely on websites 125 from which they originate, with the training set 220 only including a reference such as an URL pointing to the text documents 248 and labels corresponding to categories of the category set 205 that the text documents represent. The various videos 224, 246, 247 could likewise be stored remotely.

The classifier training subsystem 119 further comprises a classifier repository 240 containing the classifiers learned based on the content items of the training items repository 220. Specifically, the classifier repository 240 comprises initial classifiers 241 that result from training on combinations of the authoritatively labeled videos 224 with each of the supplemental training items 245, such as the combination of the authoritatively labeled videos 224 and the co-watched videos 246, and the combination of the authoritatively labeled videos 224 and the authoritatively labeled text documents 248. The classifier repository 240 additionally comprises unified classifiers 242 that result from application of a graph-based fusion algorithm to the results of the various initial classifiers 241. Thus, the initial classifiers 241 represent preliminary classifiers that are used to produce the final, more effective unified classifiers 242. Each of the initial classifiers 241 is associated with one of the categories in the category set 205 and, when applied to a video, provides a measure of how strongly the video represents that category. For example, an initial classifier 241 for the category "Tennis" provides a score measuring how strongly a given video represents the sport of tennis, e.g., based on the audiovisual content of the video and/or its textual metadata 117A. In one embodiment, a classifier produces Boolean scores representing whether or not a given video represents the category of the classifier; in another embodiment, a classifier produces a real number scalar (e.g., ranging from 0.0 to 1.0) representing how strongly (e.g., a measure of likelihood or probability) the video represents the categories, and numbers greater than some threshold can be considered to mean that the video represents the category.

The classifier training subsystem 119 further comprises a classifier training module 230 that analyzes the content items in the training set 220 and trains the set of unified classifiers 242 that can be used to automatically categorize videos.

Specifically, the classifier training module 230 comprises a data supplementation module 231 that identifies certain ones of the supplemental training items 245 and adds them to the training set 220. For example, in one embodiment the data supplementation module 231 examines an access log of the video hosting service 100 to determine which videos were co-watched, and compares these videos to the authoritatively labeled videos 224 to identify the set of co-watched videos 246. Similarly, the data supplementation module 231 performs queries of the video search module 106 using each category label of the category set 205 to identify the searched videos 247.

The classifier training module 230 further comprises a partitioning module 232 that partitions the labeled content items of the training items repository 220—that is, the authoritatively labeled videos 224 and supplemental training items 245—into positive and negative training subsets based on their labels. (As previously noted, the co-watched videos 246 and the searched videos 247 inherit the labels of the authoritatively labeled videos 224 to which they are related.) Thus, for each content item in the set of training items 220, and for each category in the category set 205, the partitioning module 232 partitions the training items into some positive subset of items representing the category and some negative subset of items not representing the category. In an embodiment in which the category set 205 is structured as a hierarchical taxonomy, the documents representing the category are defined to be the documents labeled as representing either the category or one of its descendant categories (i.e., any child subcategory of the category, or any subcategories of a subcategory, etc.). The documents not representing the category are then derivatively defined to be the documents not in the positive subset.

Thus, referring to the above category examples, the partitioning module 232 could partition the training items 220 into a positive subset of content items representing "Sports" and a negative subset of documents not representing "Sports," a positive subset representing "Tennis" and a negative subset not representing "Tennis," and so forth, for each category in the category set 205. These training subsets can then be used by an initial classifier training module 234 to train the initial classifiers 241, as described below.

The classifier training module 230 further comprises a feature extraction module 233 that extracts relevant features from the various training items 220, an initial classifier training module 234 that trains a number of initial classifiers 241 for the various categories within the category set 205 using the features extracted by the feature extraction module 233, and a fusion module 235 that trains the unified classifiers 242 based in part on values produced by the initial classifiers 241. These modules are now described in further detail.

The feature extraction module 233 extracts features from the content items of the training items repository 220, the features serving as descriptive representations of their respective content items for use in learning category classifiers. The types of features differ based on the type of the content item from which they are extracted. For example, in the case of text documents from the authoritatively labeled text documents 248, the feature extraction module 233 extracts textual features from the contents of the documents. In one embodiment, the textual features that are extracted are weighted text clusters obtained from Noisy-Or Bayesian networks. (For more details, see, for example, *Learning Bayesian Networks* by R. E. Neapolitan, Prentice Hall, 2003, which is hereby incorporated by reference.) These same textual features can also be extracted from the textual metadata of the videos 224, 247, 248 (e.g., from the title, description, and keywords associated with a video), although their descriptive power tends to be less than in the case of the labeled text documents 248, given the lesser amount of text in video metadata compared to that in a text document.

The feature extraction module 233 additionally extracts various features from video content of the videos 224, 247, 248. For example, in one embodiment the types of features include:
- A color histogram computed using hue and saturation in HSV color space;
- Color motion defined as the cosine distance of color histograms between two consecutive frames;
- Skin color features;
- Edge features using edges detected by a Canny edge detector in regions of interest;
- Line features using lines detected by a probabilistic Hough Transform;
- A histogram of local features using Laplacian-of-Gaussian (LoG) and SIFT (Scale Invariant Feature Transform);
- A histogram of textons;
- Entropy features for each frame using a normalized intensity histogram and entropy differences for multiple frames;
- Facial features such as a number of faces, or the size and aspect ratio of largest face region, with faces being detected by an extension of the AdaBoost classifier;
- Shot boundary detection based features using differences of color histograms from consecutive frames;
- Audio features such as audio volume and 32-bin spectrogram in a fixed time frame centered at the corresponding video frame; and
- "Adult" content features based on a boosting-based classifier in addition to frame-based adult-content features.

Audio and visual features are extracted in the same time interval. Then, a 1 D Haar wavelet decomposition is applied to the extracted features at 8 scales. Instead of using the wavelet coefficients directly, the maximum, minimum, mean and variance of the wavelet coefficients are used the features in each scale. This multi-scale feature extraction is applied to all of the audio and video content features, except the histogram of local features.

It is appreciated that numerous types of data could be extracted as features of a text document or a video, according to techniques known to one of skill in the art, and the above-described features are merely illustrative of the techniques of one embodiment.

The initial classifier training module 234 trains the various initial classifiers for each category of the category set 205. Different initial classifiers are trained based on the different combinations of the authoritatively labeled videos 224 with the various subsets of the supplemental training items 245. For example, in the embodiment depicted in FIG. 2, in which the supplemental training items 245 comprise a subset of co-watched videos 246, a subset of searched videos 247, and a subset of authoritatively labeled text documents 248, initial classifiers are trained for the three combinations of the authoritatively labeled videos 224 with each of these three subset. Further, for each combination, classifiers may be learned based on the types of features obtainable from the combination. For example, the two combinations of the videos 224 with the videos 246 and 247 each support both audiovisual features and text features, since videos have both audiovisual content and textual metadata, and thus both audiovisual and textual classifiers 241 are trained. In contrast, the combination of the videos 224 with the text documents 248 supports only textual features, since the text documents 248 lack audiovisual content, and thus only textual classifiers are trained. Thus, in the embodiment of FIG. 2, five distinct classifiers are trained for each analyzed category: (1) an audiovisual classifier and (2) a textual classifier trained from the combination of the authoritatively labeled videos 224 with the co-watched videos 246; an (3) audiovisual classifier and a (4) textual classifier trained from the combination of the authoritatively labeled videos 224 with the searched videos 247; and a (5) textual classifier (only) trained from the combination of the authoritatively labeled videos 224 with the authoritatively labeled text documents 248. Thus, in this embodiment each of the K categories has 5 distinct classifiers associated with it, and so there are 5K distinct classifiers in total. As noted, in one embodiment classifiers are trained only for categories having a sufficient number of associated training items, e.g., at least 50 authoritatively labeled videos 224.

More specifically, for each analyzed category of the category set 205, the initial classifier training module 234 provides the features extracted by the feature extraction module 233 from the positive and negative training subsets produced by the partitioning module 232 as input to a training algorithm. In one embodiment, the AdaBoost training algorithm is used for training the classifiers 241 based on audiovisual features from video content, and the SVM algorithm is used for training the classifiers based on textual features (i.e. the textual features extracted the textual metadata of videos 224 and from the content of text documents 248) where there are 10,000 or fewer content items for training, and the LibLinear algorithm where there are more than 10,000 content items.

With the various initial classifiers 241 trained, a fusion module 235 then trains the unified classifiers 242 based (in part) on the combined outputs of the classifiers. The training of the unified classifiers takes into account relationships between neighboring categories in the category graph, and also combines training items from different sources and possibly different content domains (e.g., video, text, audio). The unified classifiers 242 may then be applied to an arbitrary video (or, in other embodiments, to another type of media item of interest), producing as output a score for each of the categories of the category set 205, the scores measuring how strongly the video represents that category. Further details on the fusion module 235 are provided below with respect to FIGS. 3A and 3B.

The classifier training subsystem 119 optionally comprises a video classification module 250 that applies the initial classifiers 241 and the unified classifiers 242 produced by the classifier training module 230 to determine categories of the category set 205 that are applicable to a given video. Discussion of the use of the video classification module 250 is provided below.

Overall Process

Figure 3:
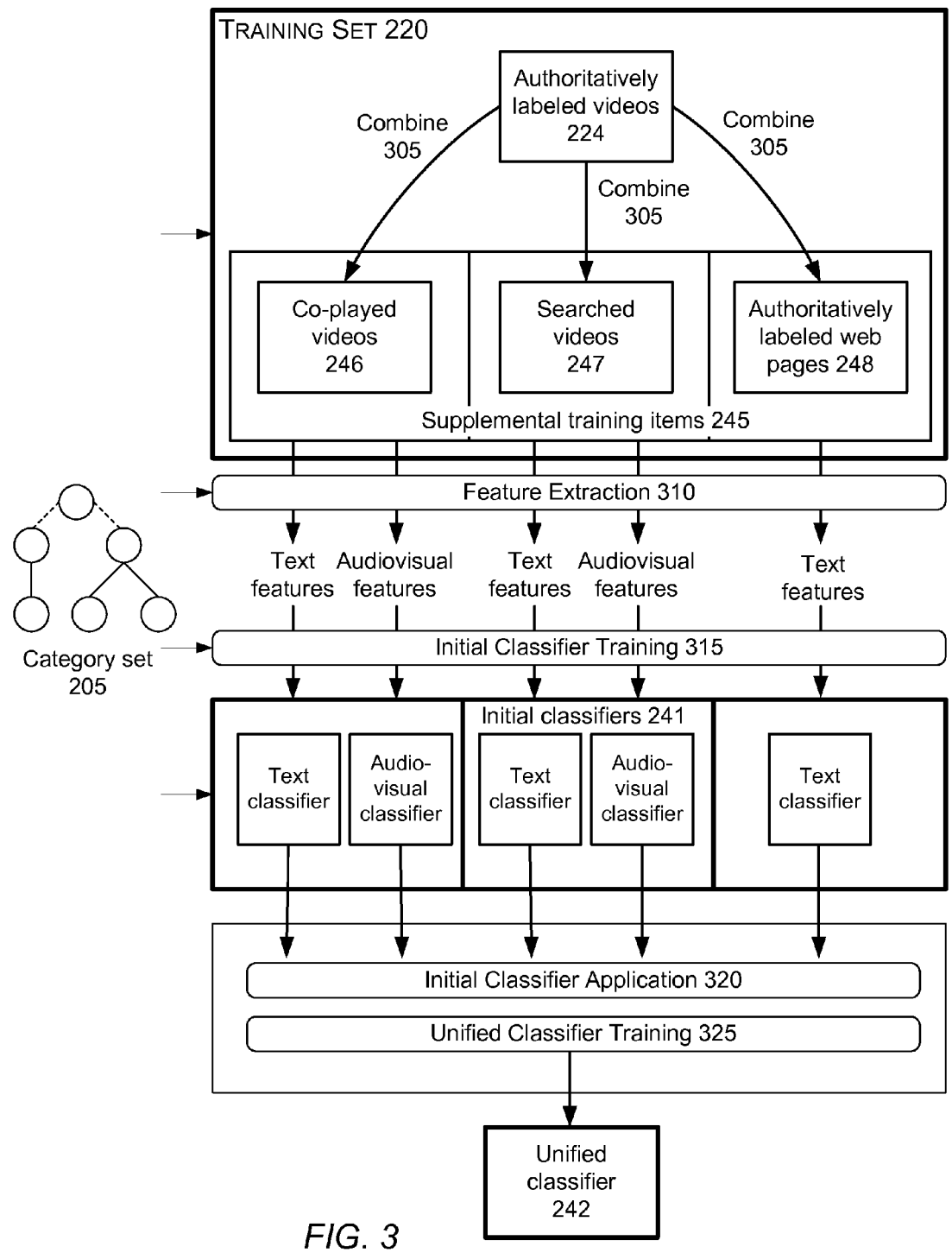
FIG. 3 is a data flow diagram representing the relationships and derivations of the various types of data analyzed and/or produced by the training subsystem, according to one embodiment.

FIG. 3 illustrates the relationships between the various modules described above, and data processing involved in the process of deriving the unified classifiers 242, according to one embodiment.

The process begins with the authoritatively-labeled videos 224, each of which has been authoritatively labeled as representing one or more categories of the category set 205. The supplemental training items 245 are then added to the authoritatively labeled videos 224, thereby forming the training set 220. In one embodiment (depicted in FIG. 3), the supplemental training items 245 include co-played videos 246, searched videos 247, and authoritatively labeled web pages 248, as described above with respect to FIG. 2. Video items 246 and 247 inherit the same category labels as the authoritatively labeled videos 224 to which they are related; the authoritatively labeled web pages 248 are independently labeled, such as by human experts or labeling algorithms.

Specifically, the authoritatively labeled videos 224 are combined 305 with each of the sets of supplemental training items 246-248. For example, assuming there are $N_1$ authoritatively labeled videos 224 and $N_2$ co-played videos 246, they are combined into a first combined set having $N_1+N_2$ items. For each category of the category set 205, appropriate features are then extracted 310 from the media items of each of the combined sets that represent the category, and an initial classifier 241 is trained 315 based on those features. Features are said to be appropriate for a combined set if they are of a type obtainable from both the authoritatively labeled videos 224 and the other set of supplemental training items 245 in the combination. For example, since both the authoritatively labeled videos 224 and the co-played videos 246 are videos having both textual features (e.g., from textual metadata) and audiovisual features, both a text classifier and an audiovisual classifier are trained for the combination of videos 224 and 246. Thus, in the embodiment of FIG. 3, there are—for every category—five distinct initial classifiers: textual and audiovisual classifiers trained from features of the combination of videos 224 and 246; textual and audiovisual classifiers trained from features of the combination of videos 224 and 247; and a textual classifier trained from features of the combination of videos 224 and web pages 248.

Each of the initial classifiers 241 is then applied 320 to score each of the media items in the training set 220. The set of scores of the various media items, along with the corresponding labels, are provided as input to the fusion module 235, which fuses the data together, training 325 a single unified classifier 242 for each of the categories 205. More specifically, the training 325 results in learning of model parameters, as described in more detail below with respect to FIG. 4. These parameters can then be used in conjunction with the other input data to infer the categories represented by an arbitrary video 320, as described in more detail below with respect to FIG. 4.

It is appreciated that the steps of FIG. 3 need not be performed in the exact order described. For example, the feature extraction 310 could be performed before the subsets of the training set 220 are combined, and the combination could combine only the extracted feature vectors. Similarly, the features need not be extracted 310 from all the combinations of the training set 220 before training 315 is performed; rather, extraction and training could be performed for one combination at a time, before proceeding to the next combination. Similarly, some of the steps could occur partially or entirely in parallel on different processing units (e.g., different machines, different processors of a single machine, or different cores of a single processor).

It is further appreciated that the unified classifiers 242 need not apply solely to digital videos, but in different embodiments applies to different types of media items, such as audio files, image files, textual files such as web pages, and the like. The process for training the unified classifier 242 in these embodiments is analogous to that disclosed above for training the unified classifiers 242 to categorize videos. That is, with the exception of possibly using different types or numbers of subsets within the training set 220 and extracting different types of feature vectors for different types of media items, the process is fundamentally the same in all such embodiments.

Unified Classifier Training and Application

Figure 4:
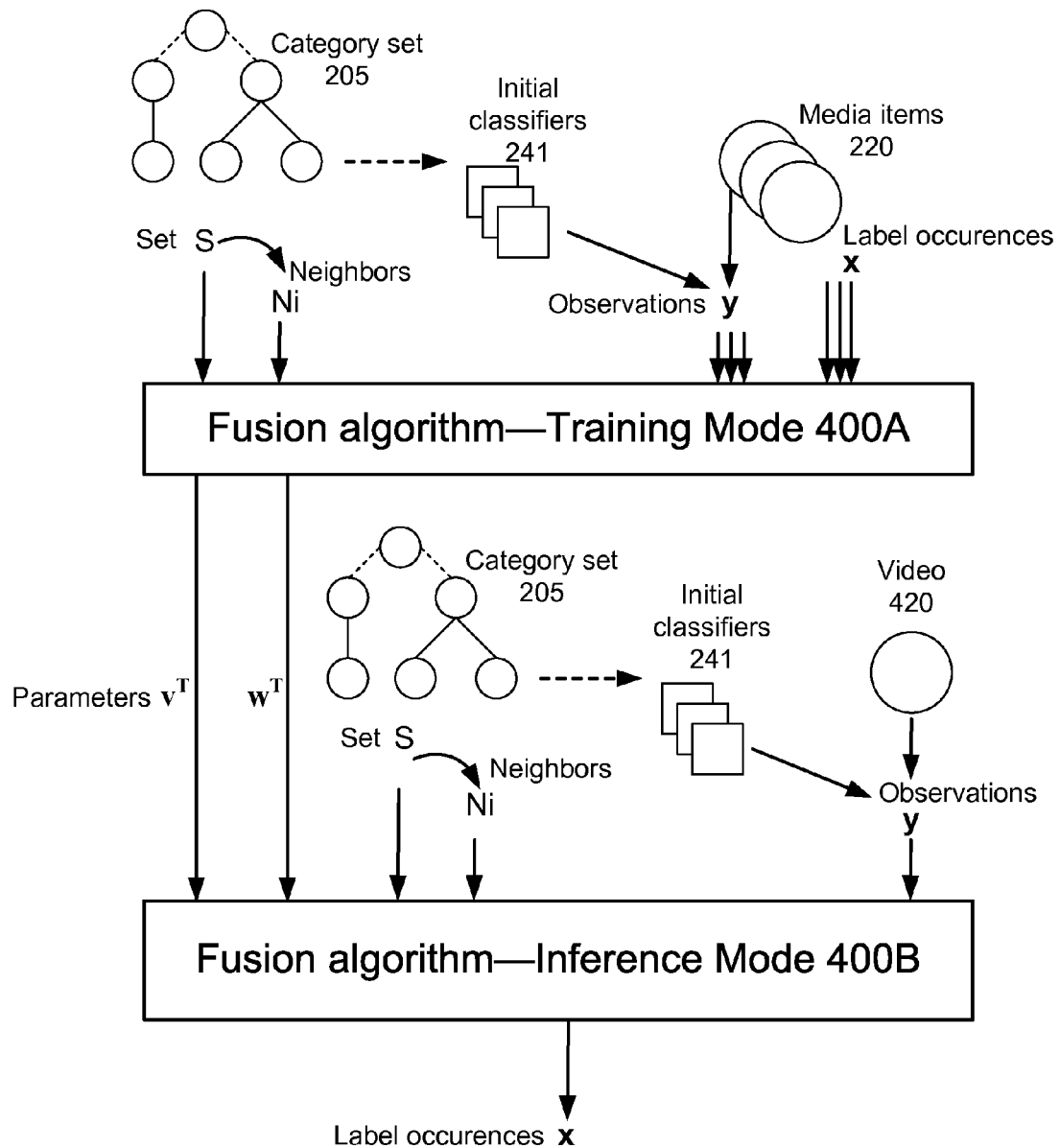
FIG. 4 is a data flow diagram representing the inputs and outputs of processes for training and for applying a unified classifier, respectively, according to one embodiment.

FIG. 4 is a data flow diagram representing the inputs and outputs of processes for training and for applying the unified classifiers 242, respectively, according to one embodiment.

As noted, the unified classifiers 242 of FIG. 2 are trained by the fusion module 235. The fusion module 235 applies the initial classifiers 241 to each of the media items in the set of training items 220. For each media item, the classifiers 241 produce a set of M*K scores, where there are K categories and M distinct classifiers per category. The set of scores is linearized to form a feature vector for the media item. Then, graph-based statistical methods of a fusion algorithm are applied to these feature vectors, to the known category labels of the media items of the training items 220, and to the graph of the category set 205 to calculate parameter values used in the unified classifiers 242. More detail on the fusion algorithm is now provided.

In one embodiment the fusion algorithm uses a Conditional Random Field/Discriminative Random Field (CRF/DRF). A CRF/DRF is a graph with a set of nodes S and edges E. The probability of a random variable x (called the "label occurrence") co-occurring with a property y (called the "observation"), p(x|y), is calculated as follows:

$$p(x \mid y) = \frac{1}{Z} \exp\left( \sum_{i \in S} A_i(x_i \mid y) + \sum_{i \in S} \sum_{j \in N_i} I_{ij}(x_i, x_j, y) \right) \quad [1]$$

where, for purposes of video classification, S is the category graph of the category set 205, each node i in S represents one of the categories in S (e.g., "Tennis" or "Arts & Entertainment") $x_i$ and $x_j$ are binary label occurrence variables for the $i^{th}$ and $i^{th}$ nodes in S indicating whether an input video represents the categories of $i^{th}$ and $j^{th}$ nodes, y is a set of observations $y_i$, each $y_i$ being the score resulting from applying the $i^{th}$ initial classifier to the input video, and Z is a normalizing constant mapping the result to the range [0.0, 1.0]. The indices i and j thus enumerate over the set of nodes in S. $A_i$ and $I_{ij}$ are referred to as the association potential and the interaction potential, respectively, and are defined as follows:

$$A_i(x_i, y) = \log \frac{1}{1 + \exp(-x_i \omega_i^T h_i(y))}, \quad [2]$$

and $$I_{ij}(x_i, x_j, y) = x_i x_j v^T \mu_{ij}(y), j \in N_i, \quad [3]$$

where $w_i^T$ and $v^T$ are parameters tending to maximize $A_i$ and $I_{ij}$, $h_i$ is the set of classifier scores and their quadratic combinations, is a pairwise feature vector for category nodes i and j, and $N_i$ denotes the neighbor nodes of i (e.g., its parent and/or child nodes).

In one embodiment, there is a distinct $w_i^T$ parameter value for each node i, and thus the parameter w is non-homogeneous. This training of a potentially different w value for each category node increases the number of parameters needed for the model, but this is computationally feasible where the number of categories is not overly large. For example, this is the case where only a modest number of potential categories have an adequate number of associated authoritatively labeled videos 224. Making w non-homogenous beneficially increases the flexibility of the model, thereby allowing the model to better simulate real-world data.

Note that the association potential $A_i$ is a function only of node i, whereas interaction potential $I_{ij}$ is a function of both node i and its neighbor nodes j. Thus, conceptually, $A_i$ contributes to the decision of the label occurrences to apply to a node i locally, without considering label occurrences of neighboring nodes, and $I_{ij}$ regulates the label occurrences of node i by performing data dependent smoothing of labels on the neighboring nodes, which serves to take into account inter-category relationships. Specifically, $I_{ij}$ relates the scores associated with neighboring nodes of the graph by computing the product $x_i * x_j$, as described further below.

A CRF/DRF as defined above thus may be applied to the problem of assigning category labels to videos or other media items. FIG. 4 represents the inputs and outputs for the training of the unified classifiers 242 by the fusion module 235 using CRF/DRF, operating a fusion algorithm in a training mode 400A, according to one embodiment. The training performed by the fusion algorithm in training mode 400A takes as input the category set 205, each category of which represents one of the nodes i in the set S of the CRF/DRF graph. Further, the neighbors $N_i$ of each node i can be determined from the graph. In one embodiment in which the category set 205 is represented as a tree, the neighbors $N_i$ may include both child and parent nodes, both of which are treated equivalently by the algorithm. In another embodiment, child and parent neighbors are treated differently. The training further takes as input the set of observations y and the set of label occurrences x, which are derived from the media items of the training set 220. Here, the observations y are the score feature vectors obtained by applying the initial classifiers 241 to the media items of the training set, and $h_i$ and $\mu_{ij}$ are a direct result of the values of y. In particular, each label occurrence value $x_i$ of x is expressed as +1 or −1, based on whether it indicates that the respective media item does, or does not, represent the category corresponding to node i.

As noted, the interaction potential of equation [3] takes into account inter-category relationships. Specifically, the label occurrences $x_i$ and $x_j$ of neighboring nodes i and j are multiplied when computing the interaction potential, and using the values +1 and −1 for the label occurrences has the effect of producing a negative product when "neighbor" concepts have different label occurrences, thereby reducing the interaction potential. This penalizes parameter values that lead neighbor concepts to have different label occurrences for the same video, which is a desired result, since parent and child concepts are expected to represent the same concepts with higher probability than non-neighboring concepts.

Further, the authoritative labels of the media items act as the label occurrences x that represent the categories applicable to the media items; that is, each category label that has been authoritatively applied to a training set item causes the label occurrence $x_i$ for the item to be +1, and the label occurrences for the category labels not authoritatively applied are −1. Assuming that there are N media items in the training set 220, K categories in the category set 205, and M different classifiers per category, then there are K*N label occurrences in x (one label per category), and M*K*N scores in observations y (M scores for each of the K categories, for each of the N media items).

Thus, the CRF/DRF expressed by equation [1] above, as applied to the problem of video categorization, quantifies the probability that a particular video or other media item represents given categories (corresponding to label occurrences x), given that the initial classifiers 241 when applied to that video produce a particular set of scores (observation y).

Note that—with respect to the training items 220—the variables S, $N_i$, x, y, $h_i$ and $\mu_{ij}$ of equations [1]-[3] are all known or can be easily calculated. Thus, only the parameters $w_i^T$ and $v^T$ remain unknown. To calculate these parameters, the fusion module 235 applies statistical methods to find the parameter values that maximize the probability expressed by equation [1], given the other variables with known values. In one embodiment, maximum likelihood estimation (MLE) is used in combination with belief propagation (BP), as would be known to one of skill in the art in the field of statistics. With the parameters $w_i^T$ and $v^T$ of the unified classifiers 242 calculated based on the representative media items of the training set 220 (for which the label occurrences x are already known), the unified classifiers can be applied to categorize videos. FIG. 4 further represents the inputs and outputs for the application of the unified classifiers 242 when the fusion algorithm is operating in inference mode 400B to categorize a video 420, according to one embodiment. As before, node set S and the neighbor nodes $N_i$ are known, as are the initial classifiers 241, and the score observations y can be obtained by applying the initial classifiers 241 to the appropriate feature vectors extracted from the video 420. (For example, textual feature vectors are extracted from metadata of the video and provided as input to the initial classifiers 241 that were trained based on textual features, and audiovisual features are likewise extracted and provided as input to initial classifiers 241 that were trained on audiovisual features.) However, at this point the parameters $w_i^T$ and $v^T$ are now known, and the category labels x remain to be calculated.

Thus, the categories S (including neighbors for each node i), the observations y, and the parameters $w_i^T$ and $v^T$ act as input for the CRF/DRF algorithm. The output, x, is a set of label occurrences, one for each category of the category set 205, each label occurrence representing whether the video 420 is of the corresponding category. In inference mode 400B, the fusion algorithm infers whether the video 420 represents the various categories 205, given the properties of the video represented by the scores of the observation y. In one embodiment, the inference mode 400B uses a maximum posterior marginal (MPM) algorithm with belief propagation (BP) to determine the category label occurrences x by maximizing the conditional probability p(x|y), given y and the other known input.

The above-described techniques have a number of properties that are particularly useful for performing video recognition in conjunction with a graph of categories. For example, the inclusion of the scores from the different types of initial classifiers 241 for a category 205 within the single observation y integrates different types of data within a single classifier, thereby allowing the use of training items 220 obtained in different ways and/or having different types of data. Further, the use of the graph algorithms, and in particular the interaction potentials that examine the interplays of neighboring category nodes, takes into account the parent-child relationships of the various categories, thereby capturing additional information and resulting in a more accurate classifier.

Uses of the Trained Classifiers

After the training process is complete, the unified classifiers 242 can, when applied to a video (e.g., by the video classification module 250), produce a score for every category of the set of categories 205. The unified classifiers 242 may then be applied to categorize videos 117 from the video repository 116 that do not already have authoritatively applied category labels. The unified classifiers 242 are provided, as input, with the same type of information that was used to train them—that is, feature vectors of classifier scores. Thus, for each category 205 and for each of the initial classifiers 241—e.g., the five initial classifiers of the example of FIG. 3—the initial classifiers 241 are applied to the input video, producing a feature vector of scores. This feature vector of scores is then provided to each of the unified classifiers 242 as depicted in FIG. 4, and the set of category scores is produced as output. In one embodiment, the video is assigned a category label for each category for which the associated unified classifier 242 produces a score above some threshold level indicating sufficient certainty that the video is indeed representative of the category.

In another embodiment, only the top-scoring C categories are used to label the video, for some integer C. In one embodiment, if the category set 205 is a taxonomy tree, a video is not assigned a label with a general parent category having a child sub-category that also applies. For example, if the classifiers for both the "Sports" category and its "Tennis" child category output scores for a given video above the threshold level, the video would be labeled with "Tennis" but not with "Sports," since the latter can be inferred from the former. In another embodiment, any category for which the associated unified classifier 242 produces a score for a video above some threshold level has its label assigned to the video, regardless of its parent/child relationships with other categories.

The category labels assigned to a video can then be used in various ways by users of the video hosting service 100. For example, the labels of the determined categories can be viewed along with other metadata of a video, e.g., appearing as video tags for the video when viewed in a web-based user interface of a video sharing site. The labels can also be used to browse videos of a particular type, such as showing all videos that were assigned labels of a chosen category, such as "Tennis." The category can be chosen in various ways, such as by direct user selection of a category. Alternatively, the category can be chosen by user selection of a document from which the category can be inferred, such as by application of the initial classifiers to a textual document, by application of the unified classifier to a video, or the like, thus implementing "show videos like this document" functionality. Similarly, they can be integrated into more sophisticated search functionality as one input, such as a search for videos of a particular category and having other additional attributes, such as particular text in their titles, a creation date within a given timeframe, or the like. The possible uses of the assigned category label are numerous, and are not limited to these specific examples.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer implemented method of training classifiers for video categories, the method comprising:
    storing a set of categories as a graph of category nodes, each node corresponding to one of the categories;
    accessing a first set of training items comprising labeled videos authoritatively labeled as representing one or more of the categories;
    accessing a second set of unlabeled videos not authoritatively labeled;
    automatically labeling ones of the unlabeled videos responsive to an observed relationship between ones of the labeled videos and ones of the second set, thereby producing a supplemental set of training items, the supplemental set of training items comprising a plurality of subsets, each subset identified using a different technique, and wherein each of a plurality of the categories has, for each of the plurality of subsets, at least one associated initial classifier trained from the subset;
    forming a training set comprising the first set and the supplemental set;
    training based on the training set, for each of a plurality of the categories, an initial classifier associated with the category that when applied to a video produces a score measuring how strongly the video represents the category, thereby producing a set of initial classifiers;
    training, for each of the plurality of the categories, a unified classifier based at least in part on scores obtained by applying the initial classifiers to the training set, the training using a graph-based statistical learning algorithm that relates scores associated with neighboring nodes of the category graph, the unified classifier when applied to a video producing a score measuring how strongly the video represents the category associated with the unified classifier; and
    storing the unified classifiers.

2. The method of claim 1, wherein the supplemental set of training items comprises at least one subset from the subsets comprising:
    related videos, wherein the observed relationship comprises co-playing of the related videos with the ones of the labeled videos; and
    searched videos, wherein the observed relationship comprises both the searched videos and the ones of the labeled videos being returned by a video search engine as the result of a query.

3. The method of claim 1, wherein the training set further comprises a set of textual documents authoritatively labeled as representing one or more of the categories.

4. The method of claim 1, wherein automatically labeling the supplemental set of training items comprises copying labels from the ones of the labeled videos to the ones of the second set with which the ones of the labeled videos have the observed relationship.

5. The method of claim 1, further comprising:
    extracting both textual features and content features from at least one subset of the supplemental set of training items;
    wherein the set of initial classifiers comprises, for at least one of the categories, both an initial classifier trained from the textual features and an initial classifier trained from the content features.

6. The method of claim 1, wherein each of the authoritatively labeled videos is authoritatively labeled by a human category expert.

7. The method of claim 1, further comprising:
    applying the unified classifiers to a first video, thereby obtaining a plurality of scores, each score associated with a category of the set of categories;
    responsive at least in part to determining that a first one of the scores is greater than a first threshold, automatically labeling the video with the category associated with the first score.

8. The method of claim 7, further comprising:
    receiving a query for videos of the category associated with the first score;
    determining that the first video has been labeled with the category associated with the first score; and
    providing a result set that includes the first video.

9. A non-transitory computer-readable storage medium having executable computer program instructions embodied therein for training classifiers for video categories, actions of the instructions comprising:
    storing a set of categories as a graph of category nodes, each node corresponding to one of the categories;
    accessing a first set of training items comprising media items of a first content type, each media item authoritatively labeled as representing one or more of the categories;
    accessing a second set of unlabeled media items not authoritatively labeled;
    automatically labeling ones of the unlabeled media items responsive to an observed relationship between ones of the labeled media items and ones of the second set, thereby producing a supplemental set of training items, the supplemental set of training items comprising a plurality of subsets, each subset identified using a different technique, and wherein each of a plurality of the categories has, for each of the plurality of subsets, at least one associated initial classifier trained from the subset;
    forming a training set comprising the first set and the supplemental set;
    for each of a plurality of the categories, training an initial classifier for the category based at least in part on the media items of the first set and on the media items of the supplemental set, the initial classifier when applied to a media item producing a score measuring how strongly the media item represents the category associated with the initial classifier, thereby producing a set of initial classifiers;
    producing a plurality of scores by applying the initial classifiers to the media items of the first set of training items; and
    training, for each of the plurality of categories, a unified classifier based at least in part on the plurality of scores, the unified classifier when applied to a video producing a score representing how strongly the video represents the category associated with the unified classifier, wherein the training uses a graph-based statistical learning algorithm that relates the scores associated with neighboring nodes of the category graph.

10. The non-transitory computer-readable storage medium of claim 9, wherein automatically labeling the supplemental set of training items comprises copying labels from the ones of the labeled media items to the ones of the second set with which the ones of the labeled media items have the observed relationship.

11. The non-transitory computer-readable storage medium of claim 9, wherein at least one of the plurality of subsets comprises media items of a second content type different from the first content type.

12. The non-transitory computer-readable storage medium of claim 9, the actions further comprising:
extracting both textual features and video content features from at least one subset of the supplemental set of training items that comprises videos;
wherein the set of initial classifiers comprises, for at least one of the categories, both an initial classifier trained from the textual features and an initial classifier trained from the content features.

13. The non-transitory computer-readable storage medium of claim 9, wherein each of the authoritatively labeled media items is authoritatively labeled by a human category expert.

14. A computer system for training classifiers for video categories, the system comprising:
a computer processor; and
a non-transitory computer-readable storage medium storing data comprising:
a set of categories arranged as a graph of category nodes, each node corresponding to one of the categories; and
a computer program executable by the computer processor and performing actions comprising:
accessing a first set of training items comprising media items of a first content type, each media item authoritatively labeled as representing one or more of the categories;
accessing a second set of unlabeled media items not authoritatively labeled;
automatically labeling ones of the unlabeled media items responsive to an observed relationship between ones of the labeled media items and ones of the second set, thereby producing a supplemental set of training items, the supplemental set of training items comprising a plurality of subsets, each subset identified using a different technique, and wherein each of a plurality of the categories has, for each of the plurality of subsets, at least one associated initial classifier trained from the subset;
forming a training set comprising the first set and the supplemental set;
for each of a plurality of categories, training an initial classifier for the category based at least in part on the media items of the first set, the initial classifier when applied to a media item produces a score measuring how strongly the media item represents the category associated with the initial classifier, thereby producing a set of initial classifiers;
producing a plurality of scores by applying the initial classifiers to the media items of the first set of training items; and
training, for each of the plurality of categories, a unified classifier based at least in part on the plurality of scores for the categories, the unified classifier when applied to a video producing a score representing how strongly the video represents the category associated with the unified classifier, wherein the training uses a graph-based statistical learning algorithm that relates the scores associated with neighboring nodes of the category graph.

15. The system of claim 14, the actions further comprising:
extracting both textual features and video content features from at least one subset of the supplemental set of training items that comprises videos;
wherein the set of initial classifiers comprises, for at least one of the categories, both an initial classifier trained from the textual features and an initial classifier trained from the content features.

16. A computer implemented method of training a video classifier, the method comprising:
storing a set of categories as a graph of category nodes, each node corresponding to one of the categories;
storing a first set of training items comprising labeled videos authoritatively labeled as representing one or more of the categories;
storing a set of unlabeled videos not authoritatively labeled as representing one or more of the categories;
identifying a supplemental set of training items comprising ones of the unlabeled videos that have an observed relationship with ones of the labeled videos, the supplemental set of training items comprising a plurality of subsets, each subset identified using a different technique, and wherein each of a plurality of the categories has, for each of the plurality of subsets, at least one associated initial classifier trained from the subset;
labeling each of the videos of the supplemental set with the labels of a labeled video with which the video has an observed relationship;
forming a training set comprising the first set and the supplemental set;
for each of a plurality of the categories:
identifying, from videos of the training set, a positive training set of videos representing the category;
extracting, from each of a plurality of videos of the positive training set, feature vectors describing characteristics of the video;
training an initial classifier associated with the category based at least in part on the extracted features, wherein the initial classifier when applied to a video produces a score measuring how strongly the video represents the category;
applying the initial classifier to videos of the training set, thereby obtaining a plurality of scores, the scores measuring how strongly the videos represent the categories associated with the initial classifiers; and
training a unified classifier based at least in part on the obtained plurality of scores for each of the plurality of categories, using a graph-based statistical learning algorithm that relates the scores produced by neighboring nodes of the category graph, the unified classifier when applied to a video producing a score representing how strongly the video represents the category associated with the unified classifier.

17. The non-transitory computer-readable storage medium of claim 9, wherein the supplemental set of training items comprises at least one subset from the subsets comprising:
related videos, wherein the observed relationship comprises co-playing of the related videos with the ones of the labeled videos; and
searched videos, wherein the observed relationship comprises both the searched videos and the ones of the labeled videos being returned by a video search engine as the result of a query.

18. The non-transitory computer-readable storage medium of claim 9, wherein the training set further comprises a set of textual documents authoritatively labeled as representing one or more of the categories.

19. The non-transitory computer-readable storage medium of claim 9, the actions further comprising:
applying the unified classifiers to a first video, thereby obtaining a plurality of scores, each score associated with a category of the set of categories;
responsive at least in part to determining that a first one of the scores is greater than a first threshold, automatically labeling the video with the category associated with the first score.

20. The non-transitory computer-readable storage medium of claim 9, the actions further comprising:
receiving a query for videos of the category associated with the first score;
determining that the first video has been labeled with the category associated with the first score; and
providing a result set that includes the first video.

* * * * *